United States Patent [19]

Hwang

[11] Patent Number: 5,568,589
[45] Date of Patent: Oct. 22, 1996

[54] SELF-PROPELLED CLEANING MACHINE WITH FUZZY LOGIC CONTROL

[76] Inventor: Jin S. Hwang, 293-4, Dongdaeshin 1-Dong, Seo-Gu Pusan City, Rep. of Korea

[21] Appl. No.: 362,201

[22] Filed: Dec. 22, 1994

Related U.S. Application Data

[63] Continuation-in-part of Ser. No. 25,077, Mar. 2, 1993, abandoned.

[30] Foreign Application Priority Data

Sep. 30, 1992 [KR] Rep. of Korea .................. OP92-3853

[51] Int. Cl.$^6$ .................. G06G 7/00; B25J 5/00; G06F 7/70; A47L 5/00
[52] U.S. Cl. .................. 395/3; 395/61; 901/1; 364/424.01; 364/424.02; 364/436; 364/438; 364/444; 364/461; 318/568.12; 15/319; 134/21; 134/18
[58] Field of Search .................. 395/3, 61; 901/1; 364/424.01, 424.02, 436, 438, 444, 461; 318/568.12; 180/169; 134/21, 18; 15/319, 340.1

[56] References Cited

U.S. PATENT DOCUMENTS

| | | | |
|---|---|---|---|
| 4,996,468 | 2/1991 | Field et al. | 318/587 |
| 5,109,566 | 5/1992 | Kobayashi et al. | 15/319 |
| 5,122,957 | 6/1992 | Hattori | 364/424.02 |
| 5,218,542 | 6/1993 | Endo et al. | 364/424.02 |
| 5,251,358 | 10/1993 | Moro et al. | 15/319 |
| 5,307,419 | 4/1994 | Tsujino et al. | 382/1 |
| 5,339,241 | 8/1994 | Fujimori et al. | 364/424.02 |

OTHER PUBLICATIONS

Kamada, H., "A Compact Navigation System Using Image Processing and Fuzzy Logic," IEEE Southeastcon 1990, pp. 337–342.

*Primary Examiner*—Robert W. Downs
*Assistant Examiner*—A. Katbab
*Attorney, Agent, or Firm*—Poms, Smith, Lande & Rose, Professional Corporation

[57] ABSTRACT

A self-propelled cleaning machine for cleaning a floor of a room enclosed by a wall perimeter includes a body having first and second sides and a front. A motor drive causes the body to move over the floor. A cleaning unit is carried by the body for cleaning the floor. First, second and third sensors are carried by the body for sensing distances from the first and second sides and the front thereof to the wall perimeter and producing first, second and third sensor signals in response thereto respectively. A fuzzy logic computer receives the first, second and third sensor signals and controls the motor drive to move the body in accordance therewith adjacently parallel to and store data representing the wall perimeter, and subsequently controls the motor drive to move the body in a computed pattern within the wall perimeter as represented by the data such that the cleaning unit cleans the floor. The computer processes the first or second signal from whichever of the first and second sensors is closer to the wall perimeter using a first number of fuzzy steps, and processes the other of the first or second signal and the third signal using a second number of fuzzy steps that is smaller than the first number of fuzzy steps.

19 Claims, 4 Drawing Sheets

SELF-PROPELLED CLEANING MACHINE WITH FUZZY LOGIC CONTROL

CROSS-REFERENCE TO RELATED APPLICATION

This application is a continuation-in-part of abandoned U.S. patent application Ser. No. 08/025,077, filed Mar. 2, 1993, abandoned.

BACKGROUND OF THE INVENTION

1. Field of the Invention

The present invention generally relates to cleaning a floor of a room enclosed by a wall perimeter, and more specifically to a self-propelled or self-running cleaning machine with automatic control.

2. Description of the Related Art

A prior art self-propelled cleaning machine is disclosed in Japanese Laid Open Patent Application No. Sho 60-93522. The overall structure of the machine is illustrated in FIGS. 1a to 1c, and a control circuit for controlling the operation of the machine is illustrated in FIG. 2.

Referring to FIGS. 1a to 1c, the prior art cleaning machine comprises a main body 1. A bumper 2 is provided around the main body 1, and a plurality of distance sensors 3 are mounted on the front side of the bumper 2 for detecting an obstacle in front of the body 1 and sensing a distance from the body 1 to the object by transmitting and receiving ultrasonic waves.

A front wheel 4, left and right rear wheels 5a and 5b, a dust suction nozzle 6, a dust collection chamber 7 for collecting dust sucked up by the nozzle 6, and a sweeper motor 8 are mounted on the bottom of the main body 1.

Wheel motors 10a and 10b are also mounted on the bottom of the main body 1, and are connected through speed reduction devices 9a and 9b, which comprise reduction gears (not shown), to the rear wheels 5a and 5b. Sensors 11a and 11b are operatively connected to the rear wheels 5a and 5b for sensing rotation of the wheels 5a and 5b and thereby the distance that the machine has run.

A control device 12 is also mounted on the main body 1 for controlling the self-propelled cleaning operation of the machine. The main body 1 further supports a power supply device 13 for applying electric power to the sweeper motor 8, the wheel motors 10a and 10b and the control device 12.

As illustrated in FIG. 2, the control device 12 comprises a running control circuit 14 for controlling the self-propelled running operation or movement of the cleaning machine. A position discrimination circuit 15 senses the position of the cleaning machine in two dimensional coordinates (X - Y coordinates), according to units of distance that the machine has run. An operation section 16 is provided for turning the cleaning machine on and off, switching running modes, setting a cleaning start position, and controlling the sensitivities of the sensors.

A remote control transmitter 17 and receiver 18 are provided for remotely controlling the cleaning machine. A motor driving section 19 controls driving power for the motors. A contact sensor 20 senses when the bumper 2 contacts an obstacle. An amplifier 21 amplifies signals from the sensors and applies the amplified signals to the running control circuit 14.

The running distance sensors 11a and 11b are part of the position discrimination circuit 15, and sense the distance that the cleaning machine has run, for example, by generating a pulse for each increment of rotation of the wheels 5a and 5b. A direction sensor 23 senses or detects changes in the running direction of the cleaning machine. The running control circuit 14 further comprises a central processing unit (CPU) 24 for controlling the overall operation of the machine, input/output circuits 25 for inputting and outputting sensor and control data between the CPU 24 and the position discrimination unit 15, a read only memory (ROM) 26, and a random access memory (RAM) 27.

A program for controlling the operation of the machine, as well as operational data, are stored in the RAM 27. A clock generator 28 feeds clock pulses to the CPU 24 for operation of the running control circuit 14. An interrupt controller 29 handles interrupts that are generated by the machine for suitable processing by the CPU 24.

The operation of the machine illustrated in FIG. 2 will be described with reference to FIGS. 1 to 3.

The user initially places the cleaning machine at a start position S in an area to be cleaned as shown in FIG. 3a, and then controls it to run straight to a first turning point P1 using the remote controller transmitter 17.

The motor driving section 19 of the cleaning machine drives the wheel motors 10a and 10b under control of the running control circuit 14. When the cleaning machine reaches a point P1, the user presses a Turn-Left key on the transmitter 17, the direction sensor 23 senses the change in running direction of the machine, and the running distance sensors 11a and 11b sense and store the distance between the points S and P1. The cleaning machine then runs straight to a second turning point P2.

In an essentially similar manner, the user controls the cleaning machine using the remote control transmitter 17 to run around the periphery of an area to be cleaned that is defined by turn points P2-P3-P4-P5-P6-P7 and an end position E. The running control circuit 14 senses and memorizes or stores the distances between these positions and the turning directions as X-Y coordinates based on the output signals from the direction sensor 23 and the running distance sensors 11a and 11b.

Then, based on the memorized or stored data, the running control circuit 14 divides the overall cleaning area into a plurality of cleaning blocks B1 through B7 by drawing longitudinal and transverse lines which pass through the turning points P1 through P7, as well as the start point S and end point E as illustrated in FIG. 3b. The cleaning blocks B1 through B7 are then combined into areas A1, A2 and A3 as illustrated in FIG. 3c based on the correlation between the adjacent cleaning blocks.

The user then presses a key on the remote controller transmitter 17 to order the control device 12 to drive the sweeper motor 8 and the wheel motors 10a and 10b so that the main body 1 of the cleaning machine is run in a reciprocating path with alternating turns in opposite directions as illustrated in FIG. 3d so as to clean the combined cleaning areas A1, A2 and A3, one by one.

The cleaning machine senses proximity to front and side obstacles and distances from the obstacles using the distance sensor 23, and senses contact with obstacles using the contact sensor 20. This enables the cleaning machine to change direction as illustrated in FIG. 3d and make any necessary corrections to the running path as required. As the cleaning machine self-runs along the path of FIG. 3d, it performs cleaning by sucking dirt into the dust collection chamber 7 through the dust suction nozzle 6 under power of the sweeper motor 8.

However, the prior art self-running cleaning machine is complicated and inconvenient to use in that the user is required to manually control the machine to run along the periphery of the area to be cleaned using the remote controller transmitter 17. If the user does not accurately control the machine during this operation to define the contour or periphery of the cleaning area, the cleaning area will not be defined accurately, and the room will not be cleaned effectively.

SUMMARY OF THE INVENTION

It is an object of the present invention to provide a self-propelled cleaning machine with automatic control which overcomes the above-described deficiencies of the prior art.

In accordance with the present invention, the cleaning machine is able to automatically sense the area that is to be cleaned by self-running along the periphery of the area. In this manner, the user is not required to initially guide the cleaning machine around the periphery of the room using a remote controller.

It is another object of the present invention to provide a self-propelled cleaning machine in which fuzzy logic control is utilized to accurately sense the periphery of an area to be cleaned and guide the cleaning machine for cleaning the area.

More specifically, a self-running cleaning machine for cleaning a floor of a room enclosed by a wall perimeter in accordance with the present invention comprises a body having first and second sides and a front. A motor drive causes the body to move over the floor. A cleaning unit is carried by the body for cleaning the floor.

First, second and third sensors are carried by the body for sensing distances from the first and second sides and the front thereof to the wall perimeter and producing first, second and third sensor signals in response thereto respectively.

A fuzzy logic computer receives the first, second and third sensor signals and controls the motor drive to move the body in accordance therewith adjacently parallel to and store data representing the wall perimeter, and subsequently controls the motor drive to move the body in a computed pattern within the wall perimeter as represented by the data such that the cleaning unit cleans the floor.

The computer processes the first or second signal from whichever of the first and second sensors is closer to the wall perimeter using a first number of fuzzy steps, and processes the other of the first or second signal and the third signal using a second number of fuzzy steps that is smaller than the first number of fuzzy steps.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 1b is a schematic plan view of the prior art cleaning machine of FIG. 1a;

FIG. 4b is a schematic side sectional view illustrating the cleaning machine of FIG. 4a;

DETAILED DESCRIPTION OF THE INVENTION

A self-propelled or self-running cleaning machine in accordance with the present invention is described below with reference to FIGS. 4a through 7.

Figure 4A:
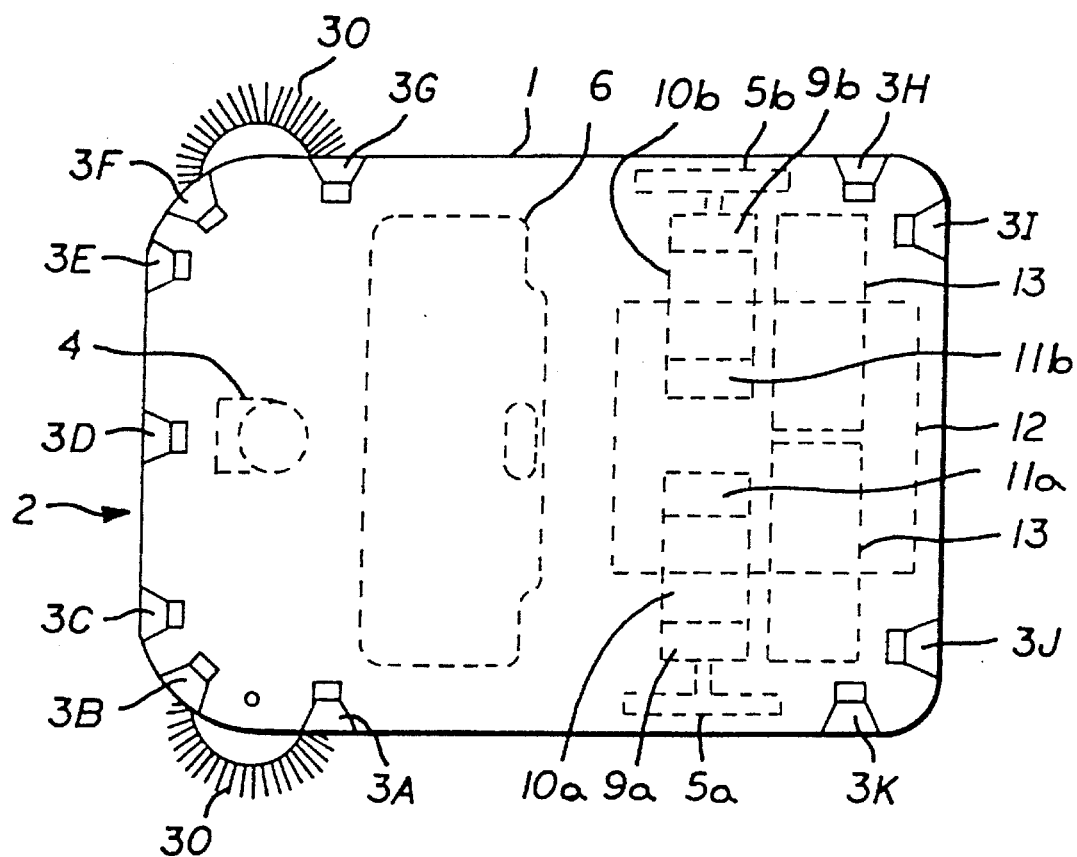
FIG. 4a is a schematic plan view illustrating a cleaning machine embodying the present invention.
Figure 4B:
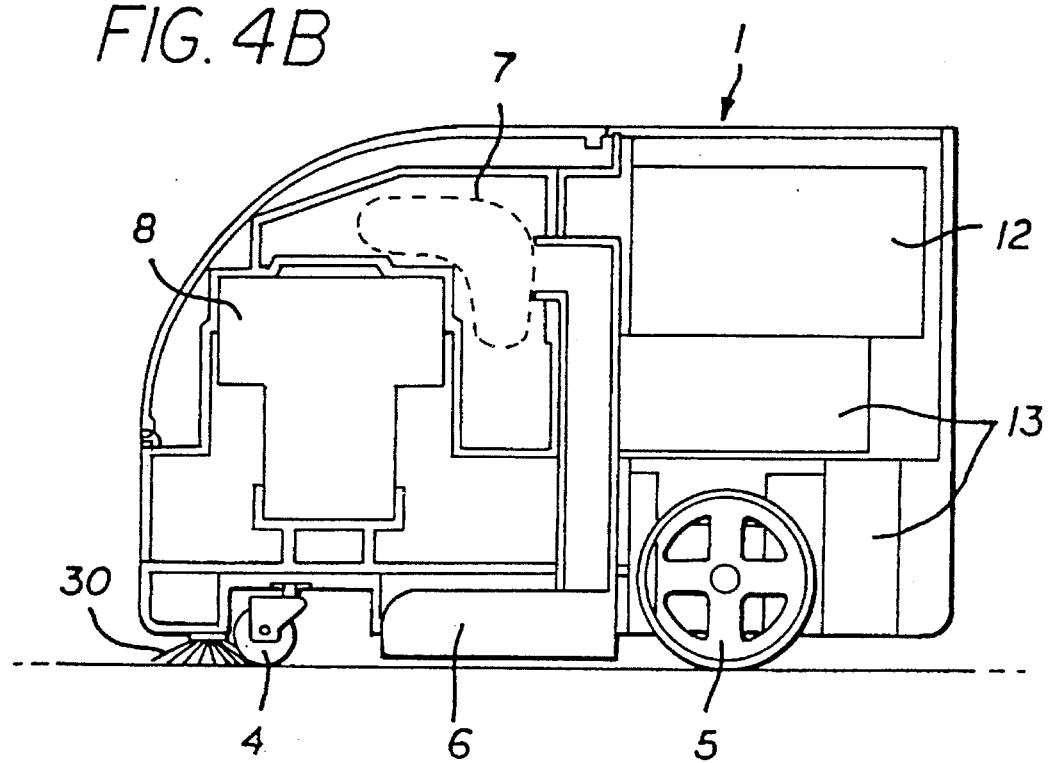

As illustrated in FIGS. 4a and 4b, a cleaning machine embodying the present invention includes a main body 1 having a bumper 2 mounted on the outside thereof. A plurality of distance sensors 3a to 3g for sensing the presence of an obstacle, and a distance to the obstacle, by transmitting and receiving ultrasonic waves, are mounted on the front of the bumper 2.

Distance sensors 3h to 3k are mounted on the rear of the main body 1 of the cleaning machine. A front wheel 4, left and right rear wheels 5a and 5b, a dust suction nozzle 6, a dust collection chamber 7, and a sweeper motor 8 for collecting dust are mounted on the bottom of the main body i of the cleaning machine.

Wheel motors 10a and 10 provide driving power to the left and right rear wheels 5a and 5b through speed reduction devices 9a and 9b which comprise reduction gears (not shown). Running distance sensors 11a and 11b are optimally connected to the wheels 5a and 5b for sensing the distance the cleaning machine has run by sensing rotational increments of the wheels 5a and 5b.

Figure 2:
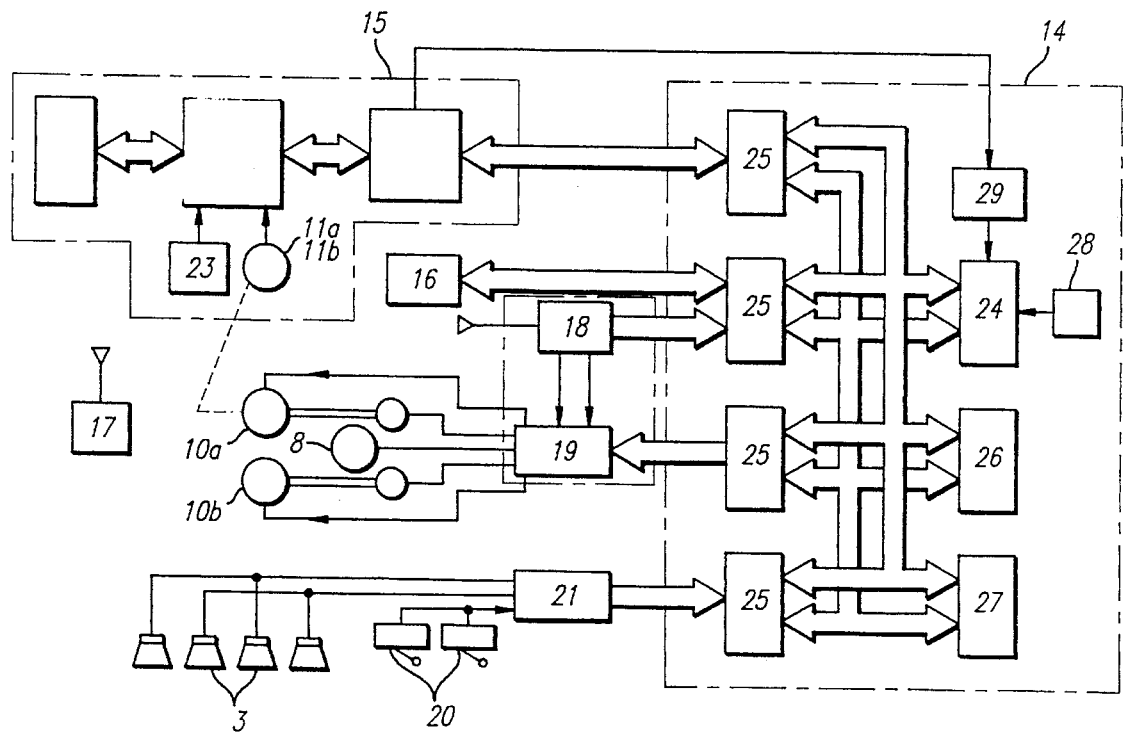
FIG. 2 is a block diagram illustrating a control device of the prior art cleaning machine.
Figure 3A:
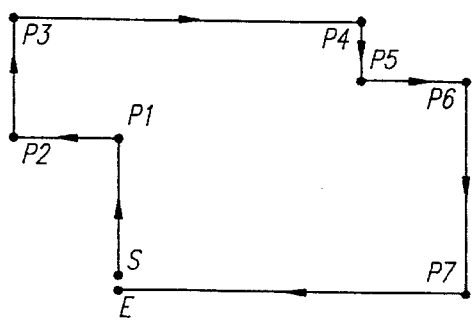
FIGS. 3a to 3d are diagrams illustrating an area to be cleaned by the prior art cleaning machine, and a path along which the machine self-runs to clean the area.
Figure 3B:
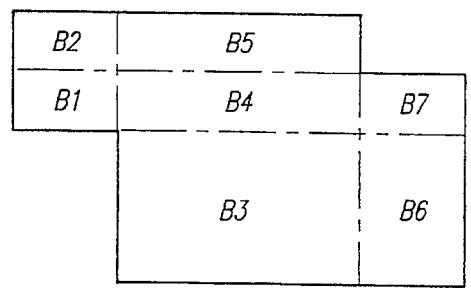
Figure 3C:
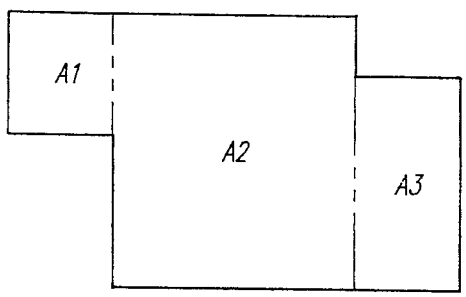
Figure 3D:
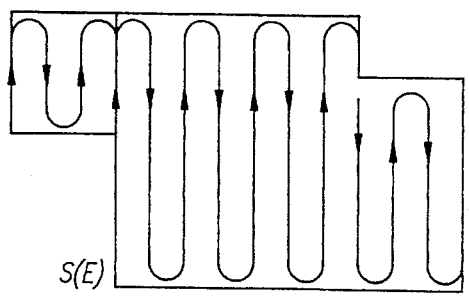

A controller 12 for controlling the cleaning operation of the cleaning machine is mounted on the main body 1. A power supply device 13 is also provided for supplying electric power to the sweeper motor 8, the wheel motors 10a and 10b and the controller 12. Brushes 30 are mounted on both front sides, and can be rotatably driven by the sweeper motor 8 or by a separate brush motor for sweeping alien material in front of the main body 1 to both opposite sides of the front of the main body 1. The construction of the controller 12 is essentially similar to that of the control device illustrated in FIG. 2.

Figure 1A:
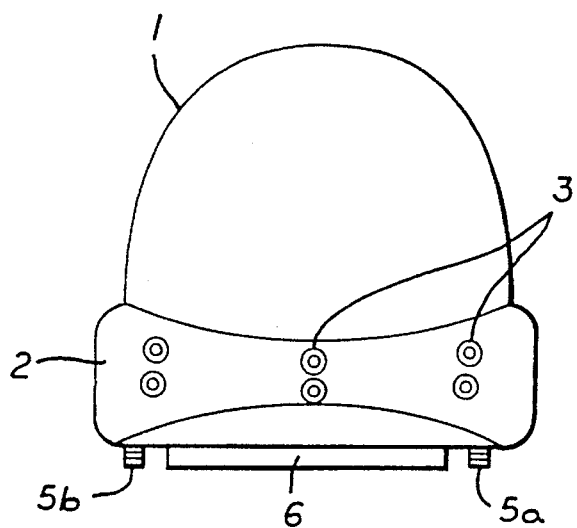
FIG. 1a is a schematic front view illustrating a prior art cleaning machine.
Figure 1B:
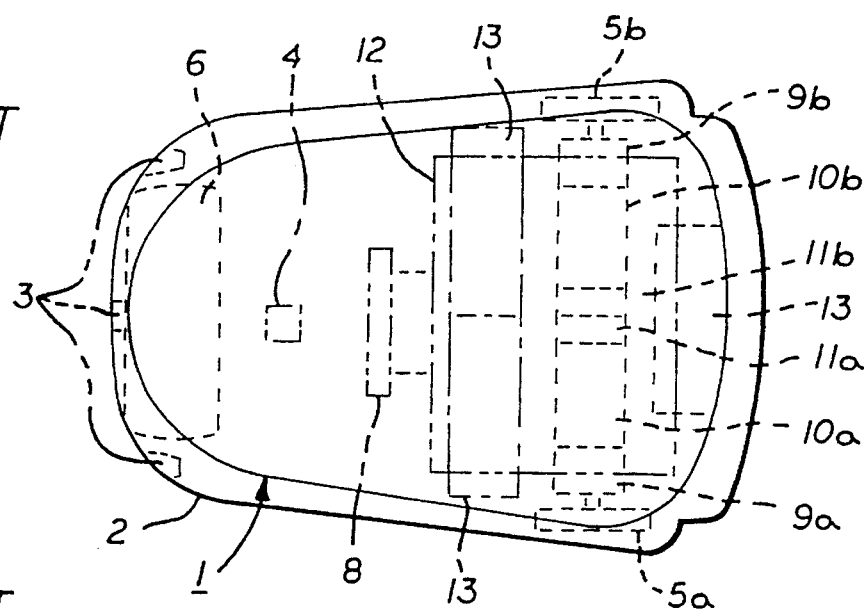
Figure 1C:
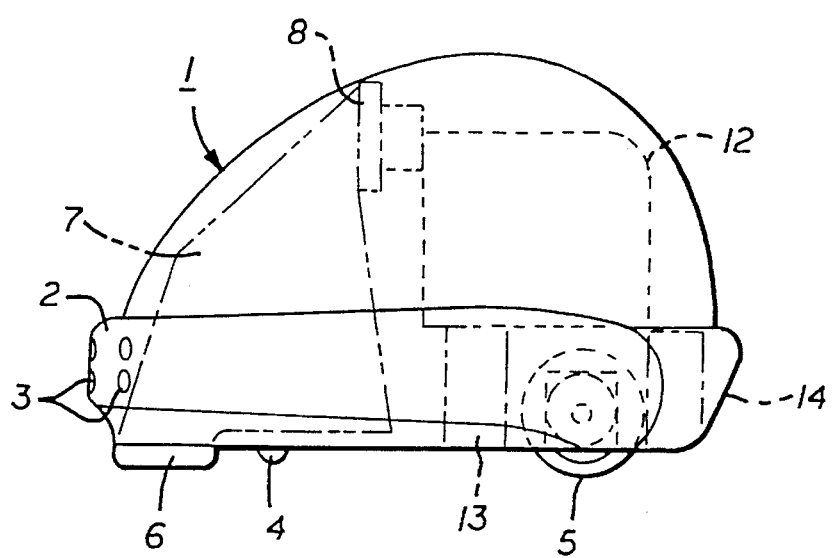
FIG. 1c is a schematic side view of the prior art cleaning machine.

A program for controlling the operation of the cleaning machine is stored in a ROM 26, and run by a CPU 24 which decodes and executes the program stored in the ROM 26. The general operation of the various circuits, motors and sensors, and the driving of the wheels is essentially similar to that described with reference to FIGS. 1 and 2.

The operation of the present cleaning machine will be described with reference to FIGS. 5a to 5d.

Figure 5A:
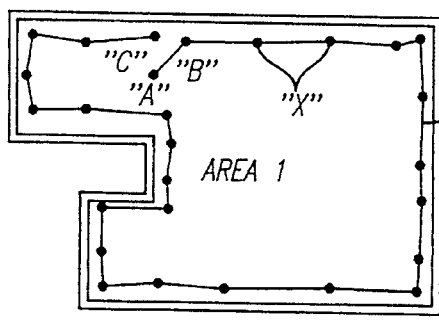
FIGS. 5a to 5d are diagrams illustrating an area to be cleaned by the present cleaning machine, and a path along which the cleaning machine self-runs in accordance with the present invention.

As illustrated in FIG. 5a, the floor of an area AREA1 is surrounded by walls or obstacles that define a periphery of the area that is to be cleaned. The cleaning machine is initially placed at an arbitrary position "A" within the area AREA1, and the power supply is turned on to cause the cleaning machine to self-run.

The controller 12 causes the brushes 30, the sweeper motor 8 and the wheel motors 10a and 10b to be driven, thereby making the cleaning machine run straight. As the cleaning machine self-runs in a straight line, the distance sensors 3a to 3g sense the distances to the walls or obstacles in each direction relative to the cleaning machine. The wheels 5a and 5b are driven to cause the cleaning machine to run at a speed corresponding to the sensed distance.

Then, based on the distance to the wall as sensed by the distance sensors 3a to 3g, the controller 12 controls the machine to change direction in such a manner that the cleaning machine runs parallel to the perimeter of the wall and is spaced therefrom by a predetermined distance.

More specifically, the cleaning machine is controlled to self-run from the location "A" shown in FIG. 5a toward the wall, and then change direction and continue to run parallel to the wall while maintaining a predetermined distance therefrom.

Figure 6A:
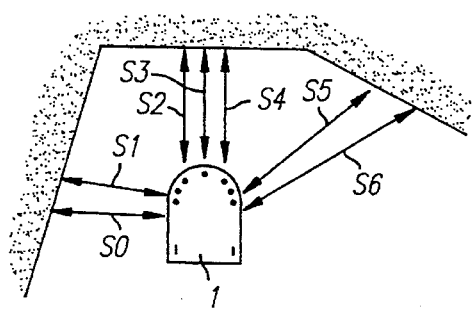
FIGS. 6a and 6b are diagrams illustrating the distance relationship between the cleaning machine and a wall, and the correlation between speed and running direction, in accordance with the present invention.
Figure 6B:
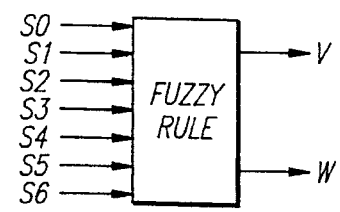

As illustrated in FIGS. 6a and 6b, a fuzzy rule and fuzzy values are defined for controlling the cleaning machine to run along the wall. The fuzzy values comprise fuzzy inputs in the form of distances S0 to S6 from the cleaning machine to the walls that are sensed by the distance sensors 3a to 3g mounted on the front and sides of the main body 1 of the cleaning machine. Fuzzy outputs that are generated in response to the fuzzy inputs comprise a fuzzy output running speed v and a fuzzy output running direction w.

When the self-propelled cleaning machine is activated, the fuzzy logic computer receives sensor signals from sensors S0–S6, these sensor signals sensing distance from the first and second sides and the front thereof to the wall perimeter. Signals are grouped into three groups, with S0 and S1 comprising the first sensor group, S5 and S6 the second sensor group, and S2, S3, and S4 the third sensor group. The computer processes the first or second signal from whichever of the first and second sensors is closer to the wall perimeter.

For example, if the left side of the unit is closer to the wall, S0 and S1 are processed. The fuzzy inputs are preferably processed by causing the distance inputs S0 and S1 sensed by the distance sensors 3a and 3b mounted on the front left side of the main body 1 of the cleaning machine to have seven possible fuzzy values; "very small (step 1)" "small (step 2)", "little bit small (step 3)", "proper (step 4)" "little bit large (step 5)", "large (step 6)", and "very large (step 7)". The distances S2 to S6 sensed by the other distance sensors 3c to 3g have two possible fuzzy values; "small" and "large".

The reason why the distances S0 and S1 have seven possible fuzzy values and the distances S2 to S6 have two possible fuzzy values is that the distances S0 and S1 are measured from the wall to which the cleaning machine runs parallel, and require a larger degree of precision to maintain the machine accurately spaced from the wall by the predetermined distance.

The running speed v and the running direction w of the cleaning machine constitute fuzzy outputs having seven possible values. For example, if w=0, the cleaning machine is controlled to run in a straight line. The largest positive value of W corresponds to a sharp right turn, whereas the largest negative value of w corresponds to a sharp left turn, with the intermediate values corresponding to intermediate angles of turn.

After the cleaning machine has self-run from the position "A" to a position "B" the controller 12 initializes a computed position of the cleaning machine to (0,0) in X-Y coordinates, and controls the cleaning machine to run parallel to the wall while being spaced therefrom by the predetermined distance.

After the cleaning machine has been controlled to automatically self-run around the periphery of the cleaning area AREA1 along a contour path or periphery PATH1 of the cleaning area AREA1, it returns to a position "C" and the controller removes driving power from the brushes 30 and the sweeper motor 8.

As the cleaning machine runs around the contour or periphery of the area AREA1 in the path PATH1, it changes direction and corrects its running path at proper times by sensing the distances to the wall and obstacles by means of the distance sensors 3a to 3k. The cleaning machine further senses contact with obstacles using the contact sensor 20 and simultaneously cleans the contour region of the cleaning area AREA1 by sucking dirt into the dust collection chamber 7 through the dust suction nozzle 6 by driving the brushes 30 and the sweeper motor 8.

As the cleaning machine runs along the wall, the distance sensors 3a and 3k sense the distance to the wall on the left side of the cleaning machine, and the X position coordinate of the left wall is calculated and stored or memorized in the RAM 27.

After a predetermined number N (where N is greater than or equal to 2) of coordinates X have been stored, the coordinates having the highest reliability among the N coordinates are selected, and their center point coordinate is calculated and stored in the RAM 27. This operation is performed repeatedly, thereby obtaining a plurality of center point coordinates for the wall to the left of the cleaning machine, and also for the other walls.

Figure 5B:
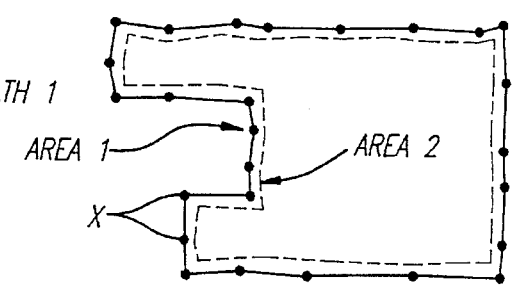

After the cleaning machine has gone around the periphery of the AREA1 from the position "A" to the position "C" as described above, the CPU 24 in the controller 14 defines the area to be cleaned as a polygon consisting of lines connecting the stored center coordinates X, as illustrated in FIG. 5b. The CPU 24 also determines an area remaining to be cleaned, designated as AREA2, that excludes the peripheral region that was cleaned while the cleaning machine ran around the periphery PATH1 of the area AREA1.

Figure 5C:
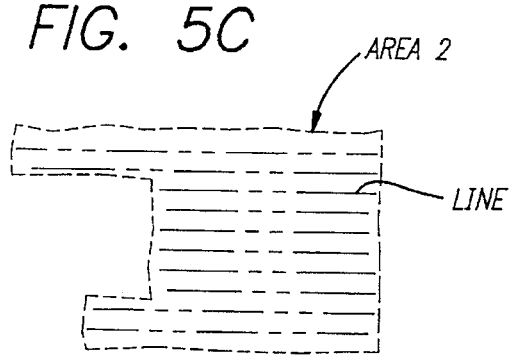

As illustrated in FIG. 5c, parallel lines LINE which are spaced laterally from each other by a distance that is smaller than the width of the main body 1 of the cleaning machine are defined in the remaining cleaning area AREA2.

Figure 5D:
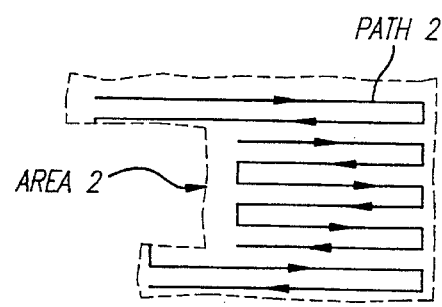

Then, as illustrated in FIG. 5d, a path PATH2 is defined by connecting the ends of the parallel lines LINE in alternating directions to define a running path for the cleaning machine. The cleaning machine is then controlled to run along the cleaning path PATH2 while driving the brushes 30, the sweeper motor 8 and the wheel motors 10a and 10b to clean the remaining cleaning area AREA2.

Figure 7A:
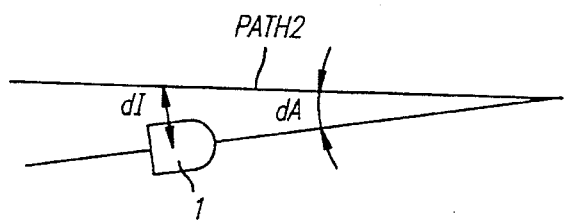
FIGS. 7a and 7b are diagrams illustrating how the cleaning machine is controlled to self-run over a cleaning path in accordance with the present invention.
Figure 7B:
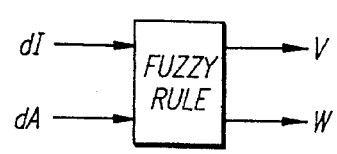

The cleaning machine is controlled to run along the cleaning running path PATH2 without deviation as will be described with reference to FIGS. 7a and 7b.

The position discrimination circuit 15 in the controller 12 calculates a current position of the main body 1 of the cleaning machine, and calculates a distance dI from which the main body is deviated from the intended path PATH2, and an angular deviation dA from the intended path PATH 2. The distance difference dI and the angular difference dA which are calculated as described above are utilized as fuzzy inputs as shown in FIG. 7a, and the running speed v and direction w of the cleaning machine are calculated as fuzzy outputs in accordance with the fuzzy inputs and the fuzzy rule.

In this manner, the cleaning machine is controlled to follow its intended path without deviation by defining a fuzzy rule and fuzzy values. For example, the distance difference dI and angular difference dA are preferably inputs to a fuzzy control having five possible fuzzy values according to the levels of distance and angular deviation.

The running speed v and running direction w are fuzzy control outputs for controlling the cleaning machine to run parallel to the wall, and the fuzzy rule and fuzzy values are defined so the cleaning machine does not deviate from the intended cleaning path PATH2.

Although the cleaning machine has been described above with reference to FIG. 5a as running clockwise around the periphery of the area to be cleaned, the invention is not so limited, and can be performed in an essentially similar manner by controlling the cleaning machine to run counter-clockwise around the periphery of the area.

In addition, FIGS. 5c and 5d illustrate the parallel lines LINE and the running path PATH2 as extending horizontally through the cleaning areas AREA1 and AREA2 respectively. However, the cleaning machine can be controlled in an essentially similar manner by having the lines LINE and path PATH2 extend vertically through these areas.

As described above, the present cleaning machine is convenient to use, since it is controlled to automatically run around the contour or periphery of the cleaning area surrounded by walls or obstacles, thereby automatically identifying the cleaning area, and then performing automatic self-propelled cleaning in the designated area.

Also, poor manual operation utilizing a remote controller to control the cleaning machine to run around the periphery of a cleaning area manually in accordance with the prior art as described above is elimination. Such poor manual operation would result in the cleaning area being poorly designated, and this would result in poor cleaning of the area.

These problems are overcome in accordance with the present invention, in which precise identification and cleaning of an area is performed using fuzzy control, and precise cleaning can be performed. Accordingly, the quality of the present cleaning machine is greatly improved over the prior art.

Whereas the present invention has been described in particular relation to the drawings attached hereto, it should be understood that other and further modifications, apart from those shown or suggested herein, may be made within the spirit and scope of this invention.

I claim:

1. A self-propelled cleaning machine for cleaning a floor of a room enclosed by a wall perimeter, comprising:

a body having first and second sides and a front;

a motor drive for causing the body to move over said floor;

a cleaning unit carried by the body for cleaning said floor;

first, second and third sensors carried by the body for sensing distances from said first and second sides and said front thereof to said wall perimeter and producing first, second and third sensor signals in response thereto respectively; and a fuzzy logic computer for receiving said first, second and third sensor signals and controlling the motor drive to move the body in accordance therewith adjacently parallel to and store data representing said wall perimeter; and subsequently controlling the motor drive to move the body in a computed pattern within said wall perimeter as represented by said data such that the cleaning unit cleans said floor; the computer processing said first or second signal from whichever of the first and second sensors is closer to said wall perimeter using a first number of fuzzy values, and processing the other of said first or second signal and said third signal using a second number of fuzzy values that is smaller than said first number of fuzzy values.

2. A cleaning machine as in claim 1, in which the fuzzy computer further updates said data in accordance with subsequent first, second and third signals.

3. A cleaning machine as in claim 1, in which the fuzzy computer updates said data by computing center points of previously computed data.

4. A cleaning machine as in claim 1, in which the fuzzy computer generates and feeds fuzzy speed and direction control outputs to the motor drive in accordance with a difference between a control speed and direction of the body that are computed in accordance with said computed pattern, and an actual speed and direction of the body that are computed in accordance with said first, second and third signals.

5. A cleaning machine as in claim 4, in which the fuzzy computer computes said computed pattern, said computed speed and direction and said control outputs in accordance with a fuzzy rule.

6. A method for controlling a self-propelled cleaning machine within a wall perimeter, said machine having a first and second side, a front side and a motor drive, comprising the steps of:

sensing a first distance signal from the first side of the cleaning machine to the wall perimeter;

ascertaining a second distance signal from the second side of the cleaning machine to the wall perimeter;

detecting a third distance signal from the front side of the cleaning machine to the wall perimeter;

determining the smaller of said first and second distance signals;

controlling the motor drive to move the cleaning machine in a computed pattern based on data received from said sensing, ascertaining, detecting and determining steps by processing the smaller of said first or second distance signals using a first number of fuzzy steps and processing the other of said first or second distance signals using a second number of fuzzy steps.

7. The method of claim 6, wherein said first number of fuzzy steps is smaller than the second number of fuzzy steps.

8. The method of claim 6, further comprising the step of storing data representing said wall perimeter subsequent to said detecting step.

9. The method of claim 8, further comprising the step of updating data representing said wall perimeter in accordance with subsequent first, second, and third distance signals after said controlling step.

10. The method of claim 8, further comprising the step of updating data representing said wall perimeter by computing center points of previously computed data.

11. The method of claim 6, wherein said controlling step further comprises generating and feeding fuzzy speed and direction control outputs to the motor drive in accordance with a difference between a control speed and machine direction computed in accordance with said computed pattern, and an actual speed and machine direction are computed in accordance with said first, second, and third signals.

12. The method of claim 11, wherein said controlling step further comprises computing said computed pattern, said computed speed and direction, and said control outputs in accordance with a fuzzy rule.

13. A control system for use in a self-propelled cleaning machine within a wall perimeter, said machine having a first and second side, a front side and a motor drive, comprising:

first, second, and third sensors for sensing distances from said first and second sides and said front thereof to said wall perimeter, thereby producing first, second, and third signals in response thereto, respectively; and a fuzzy logic computer for receiving said first, second and third sensor signals and controlling the motor drive to move the machine in accordance therewith adjacently parallel to said wall perimeter; and subsequently controlling the motor drive to move the machine in a computed pattern within said wall perimeter; the computer processing said first or second signal from whichever of the first and second sensors is closer to said wall perimeter using a first number of fuzzy steps, and processing the other of said first or second signal and said third signal using a second number of fuzzy steps.

14. The control system of claim 13, wherein said second number of fuzzy steps is smaller than said first number of fuzzy steps.

15. The control system of claim 13, wherein said computer stores data representing said wall perimeter.

16. The control system of claim 15, wherein said computer updates data representing said wall perimeter by computing center points of previously computed data.

17. The control system of claim 15, wherein said computer updates data in accordance with subsequent first, second, and third signals.

18. The control system of claim 13, wherein said fuzzy computer generates and feeds fuzzy speed and direction control outputs to the motor drive in accordance with a difference between a control speed and machine direction computed in accordance with said computed pattern, and an actual speed and machine direction are computed in accordance with said first, second, and third signals.

19. The control system of claim 18, wherein said controlling step further comprises computing said computed pattern, said computed speed and direction, and said control outputs in accordance with a fuzzy rule.

* * * * *